V. A. VIRGILIO.
ADJUSTABLE SAFETY GUARD FOR EMERY WHEELS.
APPLICATION FILED JUNE 20, 1919.
1,406,914.
Patented Feb. 14, 1922.
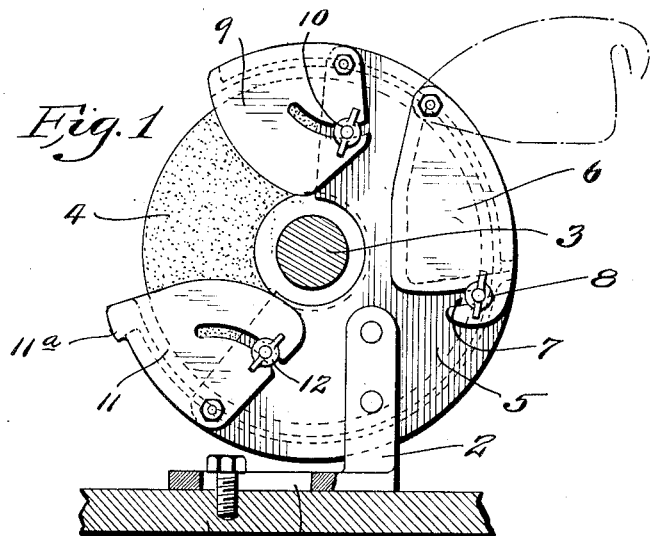
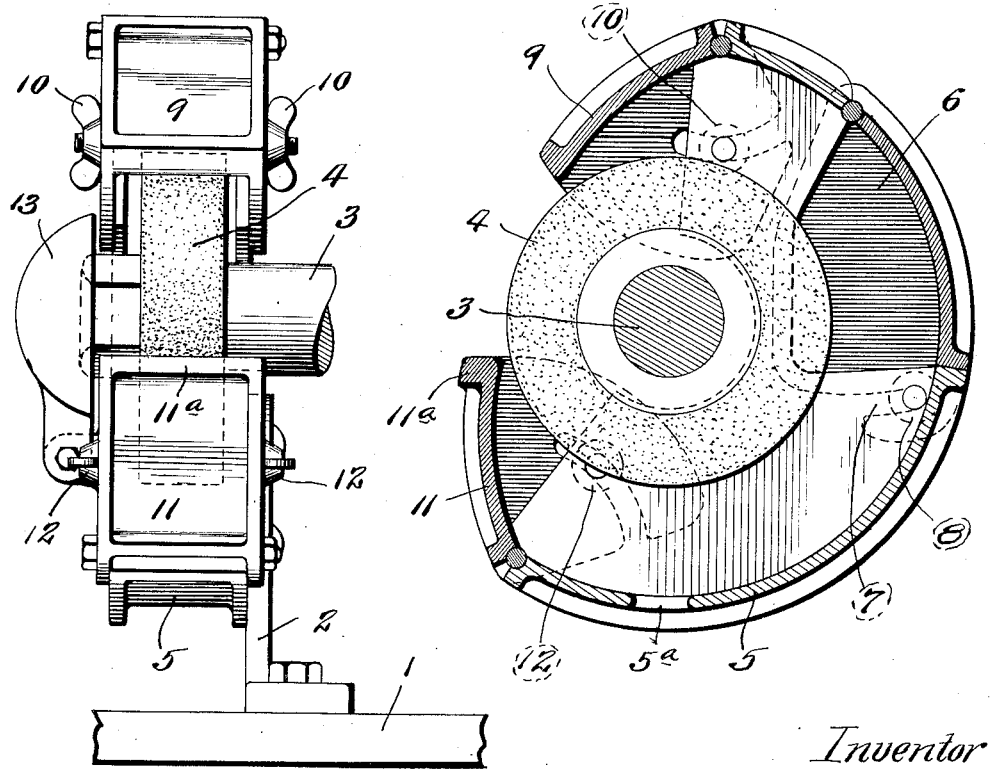
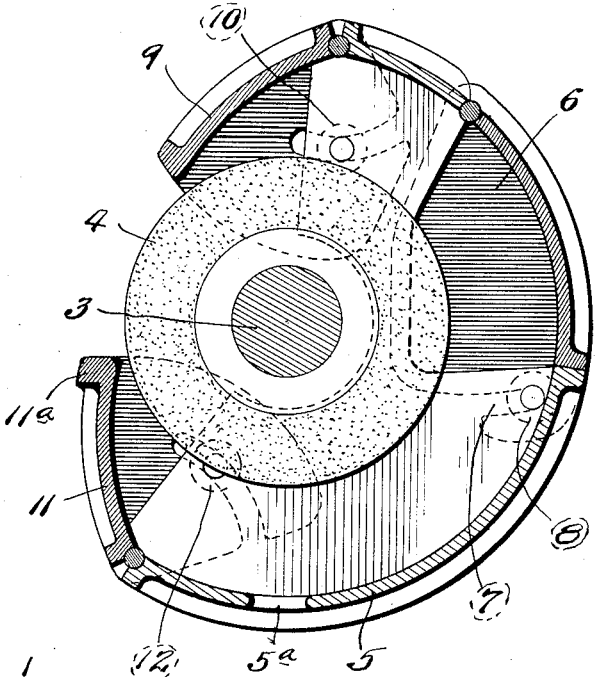
Inventor
Victor A. Virgilio

UNITED STATES PATENT OFFICE.

VICTOR A. VIRGILIO, OF ST. LOUIS, MISSOURI.

ADJUSTABLE SAFETY GUARD FOR EMERY WHEELS.

1,406,914.	Specification of Letters Patent.	Patented Feb. 14, 1922.

Application filed June 20, 1919. Serial No. 305,617.

*To all whom it may concern:*

Be it known that I, VICTOR A. VIRGILIO, a citizen of the United States, residing at the city of St. Louis, State of Missouri, have invented a certain new and useful Improvement in Adjustable Safety Guards for Emery Wheels, of which the following is a full, clear, and exact description, such as will enable others skilled in the art to which it appertains to make and use the same, reference being had to the accompanying drawings, forming part of this specification, in which—

Figure 1 is a side elevation of my improved emery wheel guard.

Figure 2 is an end elevational view of the same, and

Figure 3 is a vertical section.

This invention relates to a new and useful improvement in guards for emery wheels, the object being to construct a guard which may be adjusted to different sized wheels or to wheels whose diameters have been reduced on account of wear and must be guarded as their diameters diminish.

Another object is to provide means whereby the wheel may be dressed from the back.

In the drawings, 1 indicates the work table or support on which is arranged a bracket 2 having a slot $2^a$ by which it is adjustable toward and from the shaft 3 carrying the emery wheel 4. This bracket 2 provides a mount for an enclosing housing 5 in the form of a casing composed of side walls and an encircling wall, there being openings provided in the rear and at the front, the former of which openings is closed by a hinged portion 6 having a slot 7 on each side through which slots pass butterfly nuts 8 by which this portion of the casing may be secured in position.

In the event that the wheel is so positioned that it cannot be dressed from the front, this hinged section at the rear may be used to give access to the wheel for dressing purposes.

9 indicates a hinged section arranged at the top of the casing and provided with curved slots coincident with its pivotal axis whereby butterfly nuts 10 may engage the walls of the slots and hold said hinged section in position.

11 indicates a hinged section similar to the hinged section 9 except that it is provided with a lip $11^a$ constituting a work support, said section 11 having curved slots coincident with its pivotal axis, the side edges of which co-operate with butterfly nuts 12 for securing the same in position.

13 indicates a closure constituting a guard for the end of the shaft carrying the emery wheel in the form of a hollow convex or semispherical member pivoted at its lower end to the main body portion of a casing.

In operation, where the wheel is of a large size, parts are adjusted as shown in Figure 1. As the wheel is worn or dressed down and becomes smaller or reduced in diameter, the parts are adjusted as shown in Figure 3, the bolt in slot $2^a$ accommodating the main supporting portion of the casing to the position of the shaft to compensate for the reduced diameter of the wheel and enable the exposed surface of the wheel and the adjustable parts of the guard, when properly positioned, to comply with certain legal requirements as to the percentage of circumference of emery wheels which may be exposed under working conditions.

In some instances and particularly where it is desirable to work upon the side face of the emery wheel, the housing 5 and hinged sections 6, 9 and 11 are constructed so that one side wall of each housing and section can be removed, thereby practically uncovering one entire side face of the emery wheel, and further, if desired, the housing 5 may be made in two parts hinged to each other at a point on the rim so that one part may be elevated with respect to the other, thereby exposing approximately one-half of the periphery of the emery wheel. The lower portion of housing 5 is provided with an opening $5^a$ which permits emery dust and the like to be removed from the housing or drawn off through a suction pipe (not shown).

It will be readily understood that minor changes in the size, form and construction of the various parts of my improved device can be made and substituted for those herein shown and described, without departing from the spirit of my invention, the scope of which is set forth in the appended claims.

What I claim is:

1. An emery wheel guard comprising a housing having circular end walls and a cylindrical peripheral wall, portions of said walls being cut away to form an opening for exposing a portion of an emery wheel, oppositely disposed incurved closure plates hinged to the top and bottom of said housing and adapted to be swung in a radial direction to partially close said opening, said closure plates being provided adjacent to the end walls of said housing with inwardly projecting side walls, said side walls having slots which are concentric with the hinges of said closure plates, bolts seated in the end walls of said housing and projecting outwardly through the slots formed in the side walls of said closure plates, means having threaded engagement with the projecting ends of said bolts and adapted to engage the side walls of said closure plates whereby said closure plates can be adjusted relative to the axis of the emery wheel, and a transversely disposed rib formed on the upper edge of the lower closure plate, said rib being arranged to be used as a work support.

2. An emery wheel guard consisting of a housing having circular end walls, and a cylindrical peripheral wall, and provided with an opening for exposing a segmental portion of an emery wheel, incurved segmental plates hinged to said housing and movable towards each other for partially closing said opening, said segmental plates being provided with inwardly projecting side walls which overlap the end walls of said housing, threaded projections carried by said end walls, nuts screw seated on said projections and adapted to engage the side walls of said plates whereby the latter can be locked in any adjustable position, and means for supporting said housing, said means being adjustable whereby said housing can be adjusted relative to the axis of the emery wheel.

3. An emery wheel guard comprising a housing that is adapted to partially enclose an emery wheel, said housing being provided in its front and rear portions with openings, a hinged member normally closing the opening in the rear of said housing, and adapted when in open position to expose said emery wheel, and a pair of hinged members adapted to partially enclose the opening in the front of said housing.

4. An emery wheel guard comprising a housing that is adapted to partially enclose an emery wheel, said housing being provided in its front and rear portions with openings, a hinged member normally closing the opening in the rear of said housing, and adapted when in open position to expose said emery wheel and a pair of hinged members adapted to partially enclose the opening in the front of said housing, which pair of members are adjustable toward and away from the periphery of the wheel to which the housing is applied.

5. An emery wheel guard comprising a housing that is adapted to partially enclose an emery wheel, said housing being provided in its front and rear portions with openings, a hinged member adapted to close the opening in the rear of said housing, a pair of hinged members adapted to partially enclose the opening in the front of said housing, and a transversely disposed rib on the upper edge of the lower one of the hinged members, which rib constitutes a work support.

6. An emery wheel guard comprising an adjustable support, a housing carried by said adjustable support and adapted to partially enclose the emery wheel, said housing being provided with an opening for exposing the emery wheel through its front, adjustable members secured to the housing above and below said opening, and a transversely disposed rib carried by the upper edge of the lower one of said hinged members and which rib constitutes a work support.

In testimony whereof I hereunto affix my signature this 16th day of June, 1919.

VICTOR A. VIRGILIO.